(12) United States Patent
Miller

(10) Patent No.: US 8,162,017 B2
(45) Date of Patent: Apr. 24, 2012

(54) EASY MOUNT TIRE CHAINS

(76) Inventor: Ray R Miller, Gig Harbor, WA (US)

(*) Notice: Subject to any disclaimer, the term of this patent is extended or adjusted under 35 U.S.C. 154(b) by 0 days.

(21) Appl. No.: 12/657,472

(22) Filed: Jan. 20, 2010

(65) Prior Publication Data

US 2010/0170604 A1    Jul. 8, 2010

Related U.S. Application Data

(63) Continuation-in-part of application No. 12/077,349, filed on Mar. 19, 2008, now abandoned.

(60) Provisional application No. 61/205,954, filed on Jan. 26, 2009, provisional application No. 61/212,441, filed on Apr. 11, 2009, provisional application No. 61/278,135, filed on Oct. 5, 2009.

(51) Int. Cl.
*B60C 11/00* (2006.01)

(52) U.S. Cl. ................... 152/242; 152/171; 152/217

(58) Field of Classification Search ............... 152/171, 152/175, 213 A, 217, 218, 219, 220, 231, 152/241, 213 R
See application file for complete search history.

(56) References Cited

U.S. PATENT DOCUMENTS

| | | | | |
|---|---|---|---|---|
| 1,473,797 A | * | 11/1923 | Servis et al. | 152/213 R |
| 1,924,286 A | * | 8/1933 | Mendel | 152/213 A |
| 2,066,368 A | * | 1/1937 | Snyder | 152/225 R |
| 2,332,113 A | * | 10/1943 | Reed | 152/241 |
| 2,762,412 A | * | 9/1956 | Mank | 152/213 R |
| 2,767,760 A | * | 10/1956 | Granger | 152/213 R |
| 2,771,930 A | * | 11/1956 | Pike | 152/242 |
| 3,422,871 A | * | 1/1969 | Cartwright | 152/217 |
| 3,547,177 A | * | 12/1970 | Valley | 152/220 |
| 3,752,204 A | * | 8/1973 | Ouellette | 152/219 |
| 3,762,456 A | * | 10/1973 | Clouston | 152/213 A |
| 3,833,039 A | * | 9/1974 | Bear | 152/241 |
| 3,842,881 A | * | 10/1974 | Muller et al. | 152/213 A |
| 3,974,871 A | * | 8/1976 | Muller et al. | 152/239 |
| 4,130,155 A | * | 12/1978 | Barnett et al. | 152/217 |
| 4,146,075 A | * | 3/1979 | Riedel | 152/213 R |
| 4,282,916 A | * | 8/1981 | Carlson | 152/241 |
| 4,306,602 A | * | 12/1981 | Nestlen | 152/219 |
| 4,391,315 A | * | 7/1983 | Jacobson | 152/213 A |
| 4,416,318 A | * | 11/1983 | Rieger et al. | 152/213 A |
| 4,679,608 A | * | 7/1987 | Jeindl | 152/213 A |
| 4,958,415 A | * | 9/1990 | Johnson | 24/69 TT |
| 5,056,206 A | * | 10/1991 | Poulsen | 29/428 |
| 6,026,876 A | * | 2/2000 | Snyder | 152/218 |
| 6,085,816 A | * | 7/2000 | Clark et al. | 152/220 |
| 6,725,894 B2 | * | 4/2004 | Clark | 152/217 |
| 7,174,933 B1 | * | 2/2007 | Miller | 152/171 |
| 7,204,282 B2 | * | 4/2007 | Scott et al. | 152/242 |
| 7,398,806 B1 | * | 7/2008 | Miller | 152/171 |

FOREIGN PATENT DOCUMENTS

JP    62273106 A  * 11/1987

\* cited by examiner

*Primary Examiner* — Jason Bellinger

(57) ABSTRACT

Revised tire chain attachments and mounting methods, for use on an otherwise typical, presently marketed link construction, ladder pattern, truck tire chain, to reduce chain slack and increase chain tension, from mounting, and increase the feasibility of one stop mounting for a broader range of tire sizes and truck loading conditions, by providing a better fit of the chain to the tire footprint, as affected by the specific tire size and truck loading.

15 Claims, 14 Drawing Sheets

EASY MOUNT TIRE CHAINS

CROSS REFERENCE TO RELATED APPLICATIONS

Figure 1A:
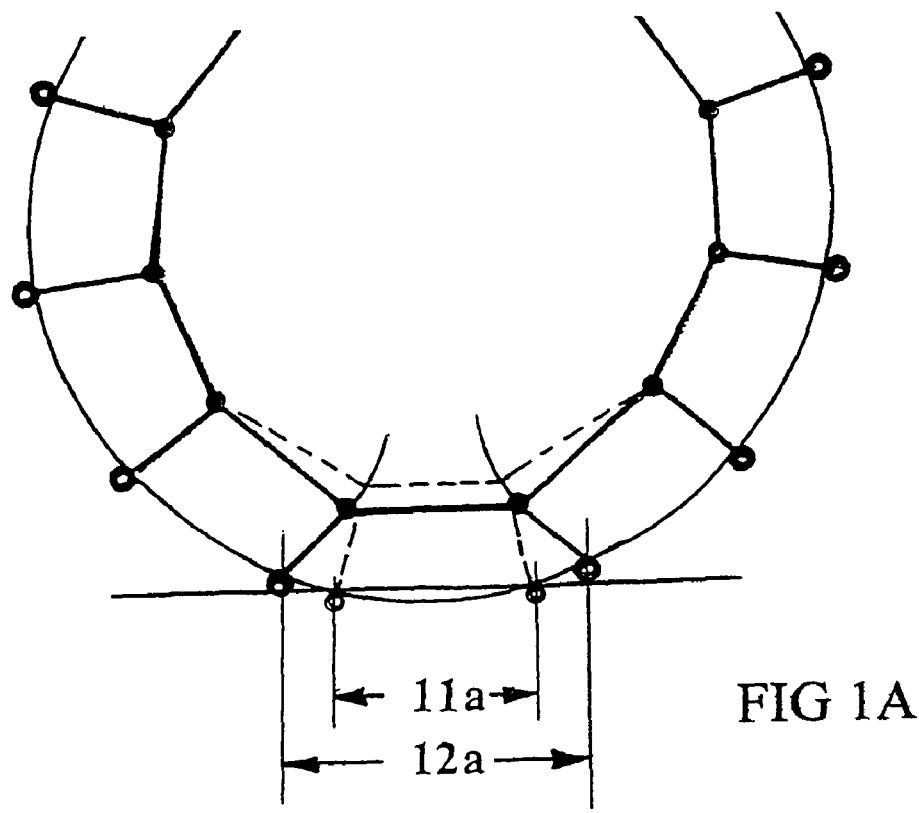

This application is a Continuation in Part of my patent application Ser. No. 12/077,349 dated Mar. 19, 2008, with Notice of Allowance dated Nov. 17, 2009, now abandoned, and to my Provisional Patent Applications 61/205,954 dated Jan. 26, 2009, 61/212,441 dated Apr. 11, 2009, and 61/278,135 dated Oct. 5, 2009, all entitled "Easy Mount Tire Chains".

FEDERALLY SPONSORED RESEARCH

Not applicable.

SEQUENCE LISTING OR PROGRAM

Not applicable.

BACKGROUND OF THE INVENTION

1. Field of the Invention

Providing configurations and methods to enable mounting vehicle tire chains in one stop of the vehicle, by modifying standard chain configurations and methods, while also providing full chain strength in operation.

2. Prior Art

The time honored method for mounting a tire chain upon the wheel is the roll on method. For that method, the chain is draped over the top of the wheel and a chain end tucked under the wheel, to drive onto. That mounting method is typically specified by chain suppliers.

The system of creating sizes of tire chains for marketing, produces relatively large increments of size between standard sizes of chains. This causes no particular problem when using the roll on method of mounting chains, but causes significant misfits on some tire sizes, when mounting chains about the tire footprint, in order to mount the chain in one stop of the vehicle.

The critical feature is the gap between the end-of-chain cross chains, when mounted on the tire. In general, each chain size covers a range of tire sizes, in which some tire sizes have an end-of-chain gap too small, some just right, and some too large.

One stop mounting, about the tire to ground contact area, is practiced by many chain users, and has the advantage of requiring only one stop of the vehicle for chain mounting. However, in present practice, the above defined problem of end-of-chain gap size is ever present. Thus the mounting conditions are greatly variable, and the smaller tires, within a chain size range, have cross chains deflected much more, and therefore develop much more slack when the wheel moves, eliminating the restraint of the tire footprint. Typically, rubber tightener straps are used to absorb the slack developed in operation, which greatly reduces effective chain strength. Often, an additional stop is required to re-tighten the chains, after initial operation.

The problem at the upper end of a chain size range exists, regardless of mounting method. That is, an oversized end-of-chain gap produces a section of tread without traction enhancement, whether mounted one stop or roll on method.

A lesser problem, but one that applies to all chains, without exception, is the small slack, of up to about two inches, resulting from the need to connect the ends of the outer face side chain. The available accuracy of determining the length of the side chain, fully mounted, is one side chain link pitch. The resulting actual slack cannot be known in advance of the initial chain mounting, due to the variability of tire dimensions, from all sources, including tread wear.

The optimum chain tension, during operation, is not presently known, but it is well recognized, by all users, that some amount of positive chain tension, during operation, is highly desirable. It is generally intended that the rubber straps applied manually provide that tension, but the variables in the use of such straps are large, and stabilization of the chain by steel is much preferred.

GENERAL NATURE OF THE INVENTION

The present disclosure is a set of interacting novel improvements of tire chain configuration and methods of utilization, which supplement each other to collectively add up to distinct improvements of tire chain mounting and operation. This set of steps is displayed in Table 1 to help define and understand the interaction of the several individual disclosures, which successively interact with other steps to produce the end result.

Step a is an optional modification of the present coarse gradation of chain sizes, to provide a more uniform end-of-chain spacing of cross chains on each tire size, to greatly enhance one stop mounting of chains by reducing deflection of cross chains in mounting and the resulting slack in operation. This is an optional step, as the remaining steps can produce improvements in all cases, without using Step a. Step a is required to produce full strength one stop mounts for the poorer fitting tire sizes.

Step b is to adopt one stop mounting of chains, and avoid roll on mounting. Obviously, this is not claimed as an invention, but it is definitely an important step in the interaction of the disclosures, as it inherently improves mounting results, versus roll on mounting, as to avoiding chain slack and providing the desired level of chain tension. Without this step, some of the

TABLE 1

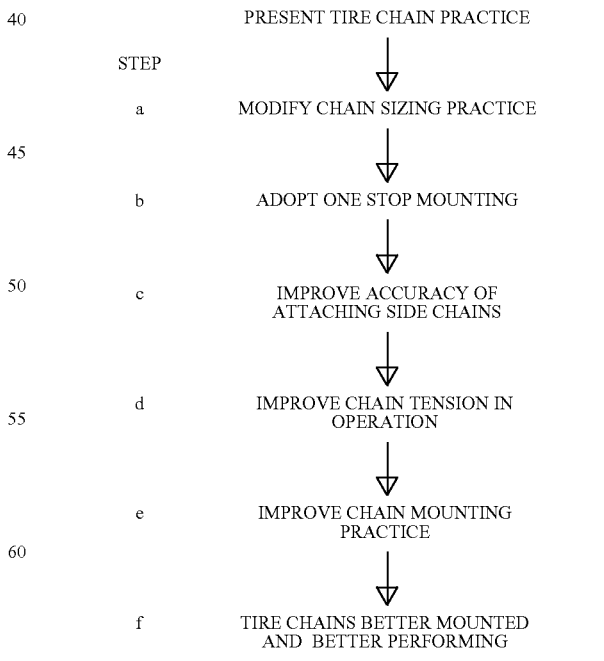

| STEP | PRESENT TIRE CHAIN PRACTICE |
|---|---|
| a | MODIFY CHAIN SIZING PRACTICE |
| b | ADOPT ONE STOP MOUNTING |
| c | IMPROVE ACCURACY OF ATTACHING SIDE CHAINS |
| d | IMPROVE CHAIN TENSION IN OPERATION |
| e | IMPROVE CHAIN MOUNTING PRACTICE |
| f | TIRE CHAINS BETTER MOUNTED AND BETTER PERFORMING | disclosures have little or no value. This disclosure is directed to one stop mounting only, and is not for use with the present method of roll on mounting, although a secondary step available in some cases, includes rolling the wheel a quarter turn.

Step c is a relatively simple way of reducing an intrinsic source of slack, by improving the accuracy of attaching the outer face side chain, as to effective side chain circumference, when mounted, and resulting chain fit, through the use of an adjustment link which can be selected with a preferable reduced pitch length versus the typical straight links of the side chain. The preferred embodiment is a pitch length of one half of the pitch length of the side chain link. This is a feature that is used as needed, and will always be needed at some point in the life of the chain, due to tread wear, which changes chain fit.

Step d improves chain tension in operation by use of an improved design of slack removal and tensioning device, and optional tension sources to provide improved chain tension levels during operation.

Step e is an improved chain mounting procedure, which will improve the mounting of any chain using the present invention features. These improved mounting practices can only be employed when the earlier steps outlined above, are utilized. The practices cannot be independently adopted, to full effect. The practices are an integral part of the total disclosure.

Together, the above steps operate interactively to provide a tire chain, mounted more easily and more uniformly, to have the desired level of chain tension and general performance.

Alternatives for Step a, above, interacting with Step e, are displayed in Table 2.

The present disclosure is highly advantageous to tire chain usage on a tire category known as open shoulder, due to grooves essentially normal to the tread circumferential edges. The novel chain features disclosed reduce problems including difficult chain mounting and tread damage due to cross chains slipping off tread blocks.

OBJECTIVES OF THE INVENTION

It is an objective to provide vehicle tire chain configurations suitable for mounting in one stop of the vehicle.

It is an objective to provide tire chain configurations in general conformity with present design practice, but modified to be suitable for one stop mounting.

It is an objective to provide tire chains suitable for one stop mounting by imposing the tire chain about the tire to ground contact area.

An objective is to provide a flexible system of modifying present practice tire chain configurations, for increased suitability for one stop mounting, in order to provide good chain fit for all vehicle tire sizes.

An objective is to provide tire chain configurations which enable mounting tire chains to minimize the formation of chain slack during operation.

It is an objective to provide vehicle tire chains for one stop mounting, with positive chain tension during continuous operation, based on stabilization of the chain by steel, not rubber.

It is an objective to provide tire chains suitable for mounting in one stop by configuring the chain to have a cross chain spacing at the point of joining the chain ends, which will be slightly less than the length of the tire footprint.

It is an objective to provide tire chains with better traction and safer operation, by reduction of cross chain spacing at the point of joining the chain ends, when mounted on the tire, in those cases when standard chain size practice produces excess spacing.

An objective of this disclosure is to provide a selection of design features to assist the chain user in his optimization of one stop mounting of tire chains, according to his preferred practice and operating conditions, and the efficient and economic operation of such chains.

An objective is to provide improved chain mounting techniques for improved chain performance.

An objective is to provide improvements in chain design and manufacture, to enable selling chains which better fit specific tire sizes.

SUMMARY

The invention provides, for vehicle tire chains, interactive novel features of chain configuration, methods of supply, and techniques of installation on the vehicle, which greatly improve one stop mounting of the chain on the vehicle, and produce improved operating performance as to chain fit and tightness, effective strength in operation, and allied operating results such as chain wear, chain life, and chain safety. In all cases, the objective is to utilize a basically standard chain, as presently marketed, modified to provide the improved results.

The tire chain sizing system used today is strongly based on minimizing the number of chain sizes required to fit all tire sizes, and the system utilizes the naturally modular nature of ladder style link chains. Modifications are disclosed here to adapt present chain sizes to better fit specific tire sizes.

The disclosure includes matching the chain pattern and open shoulder tire shoulder groove pattern for better chain fit and performance on open shoulder tires.

BRIEF DESCRIPTIONS OF THE DRAWINGS

Figure 1B:
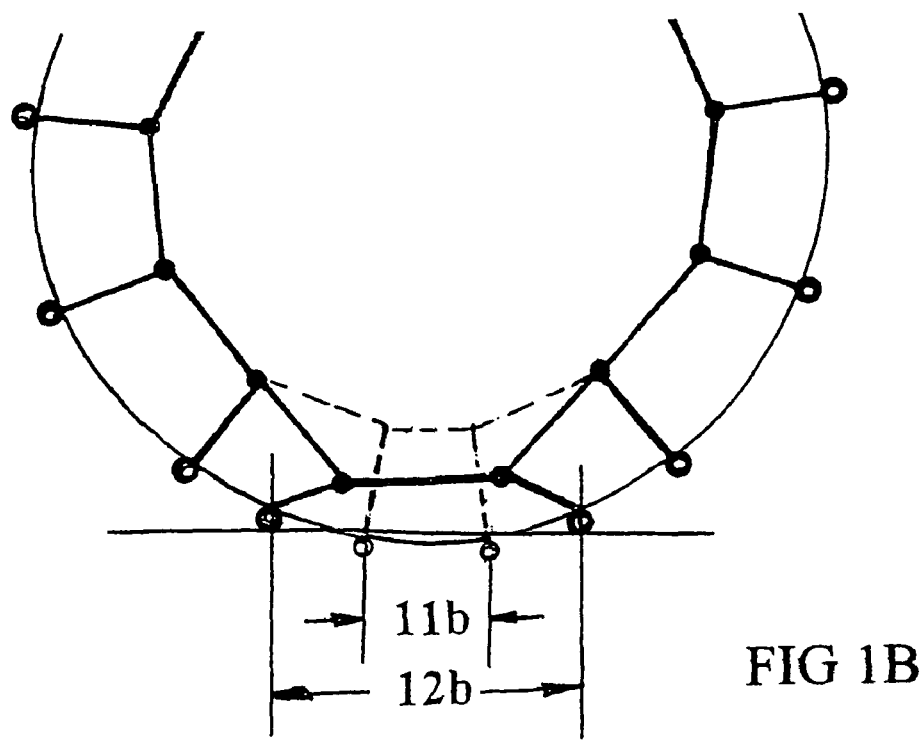
Figure 2A:
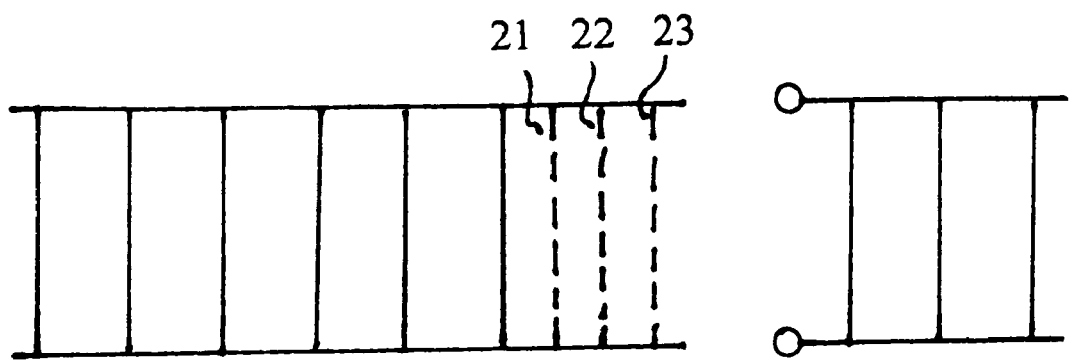
Figure 2B:
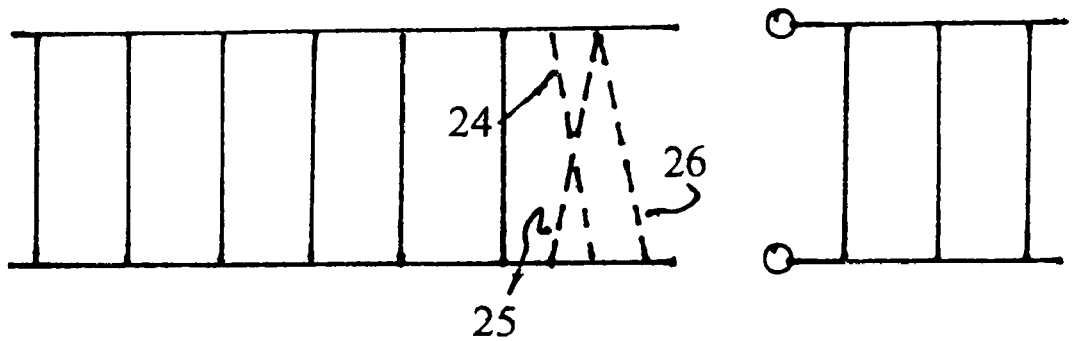
Figure 3A:
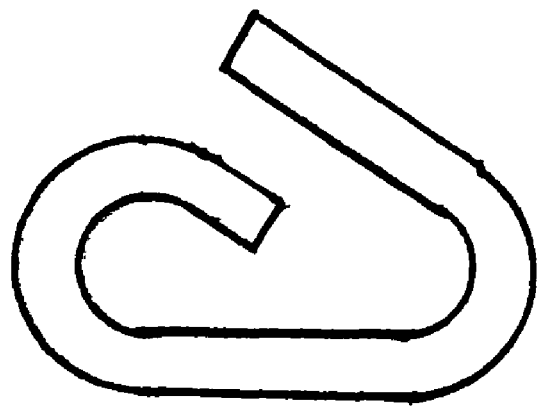
Figure 3B:
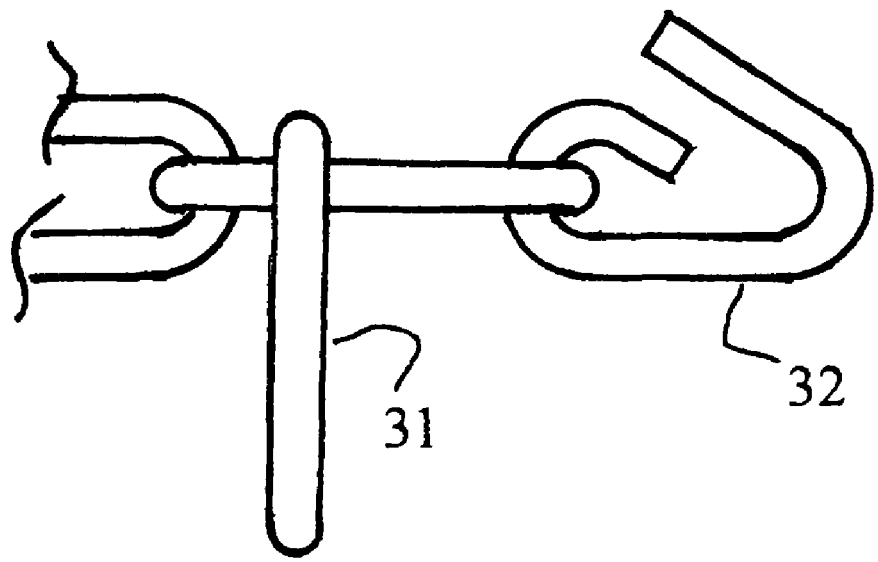
Figure 4A:
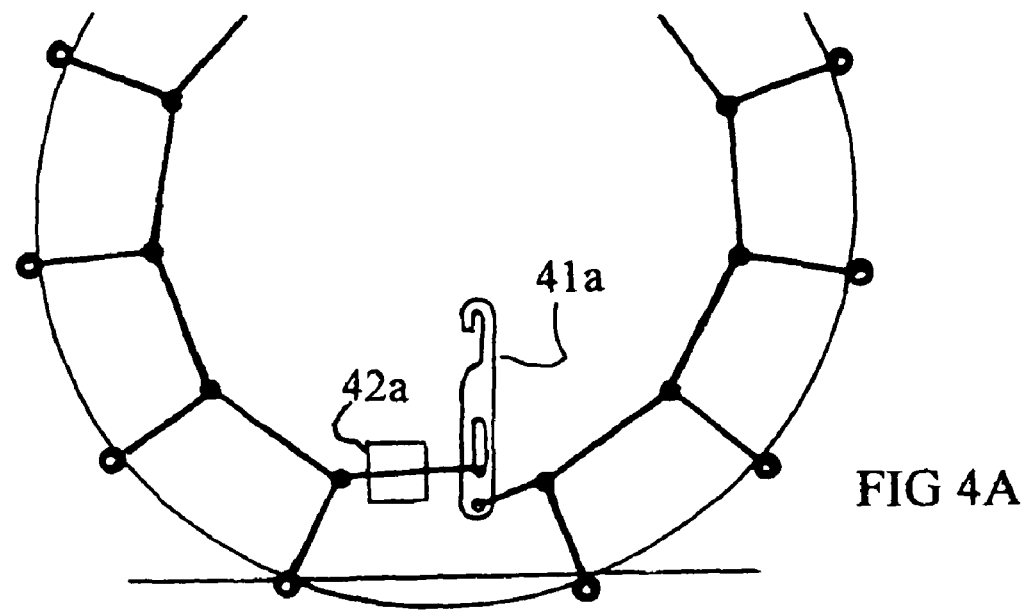
Figure 4B:
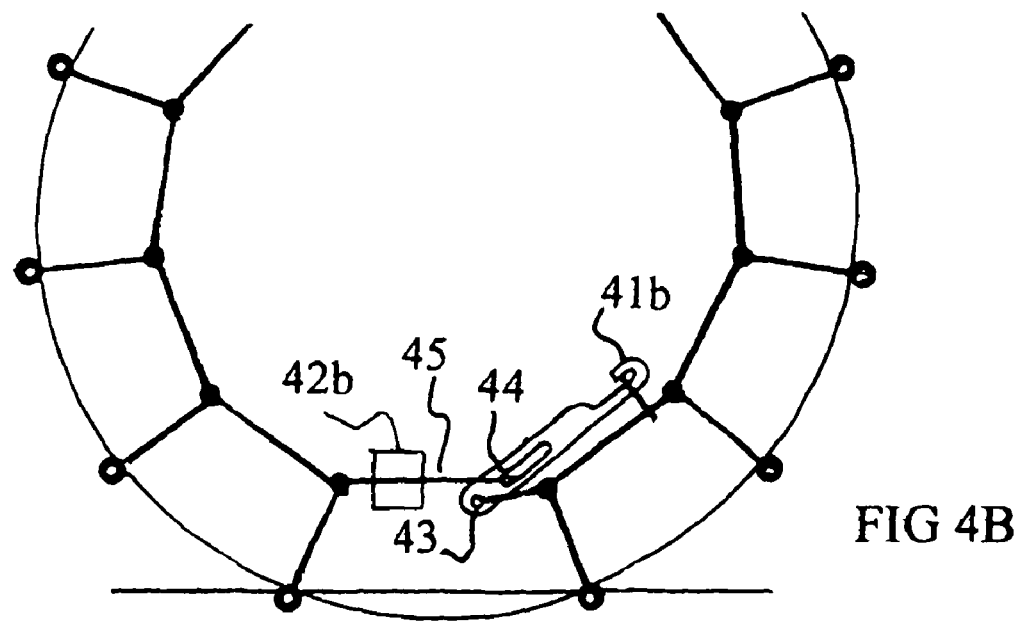
Figure 4C:
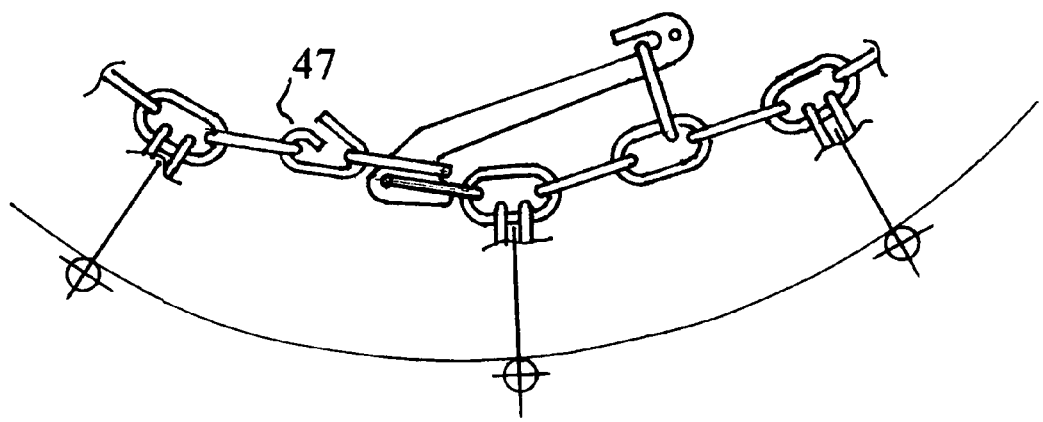
Figure 10:
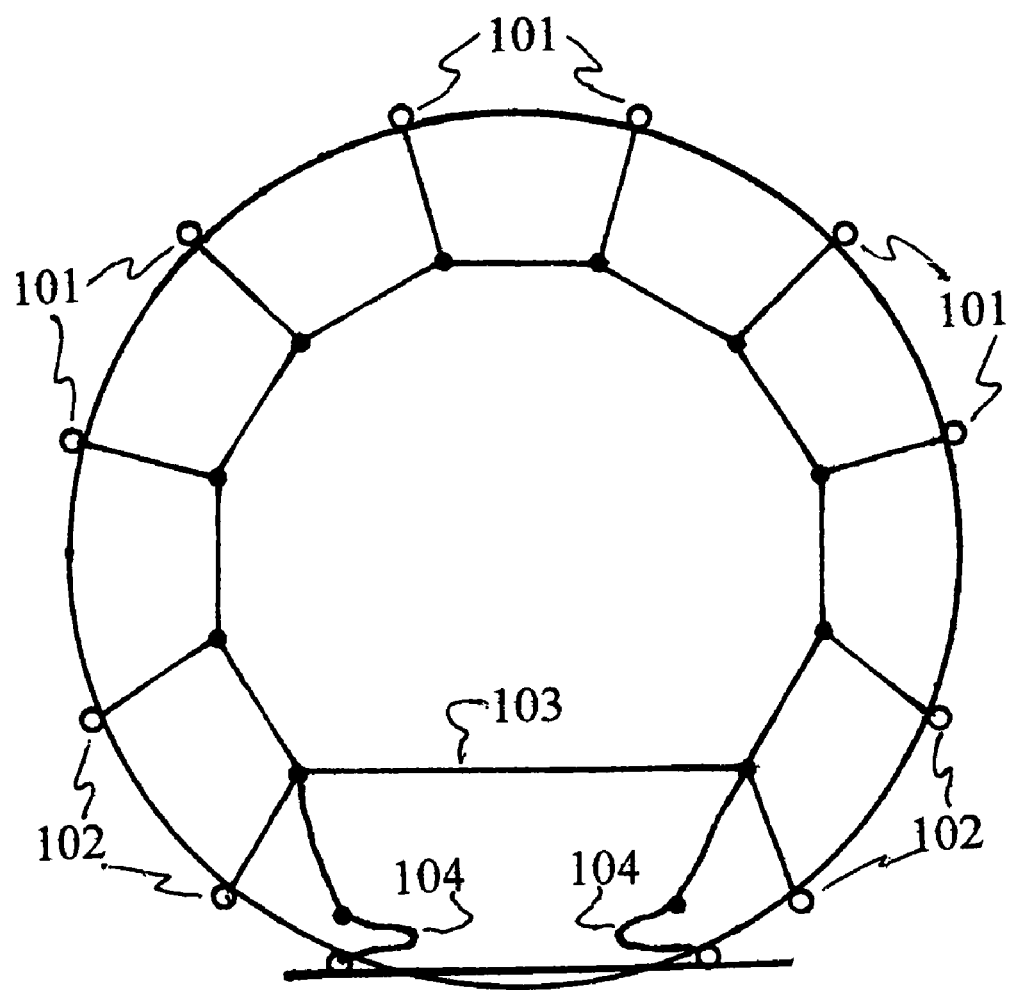
Figure 11A:
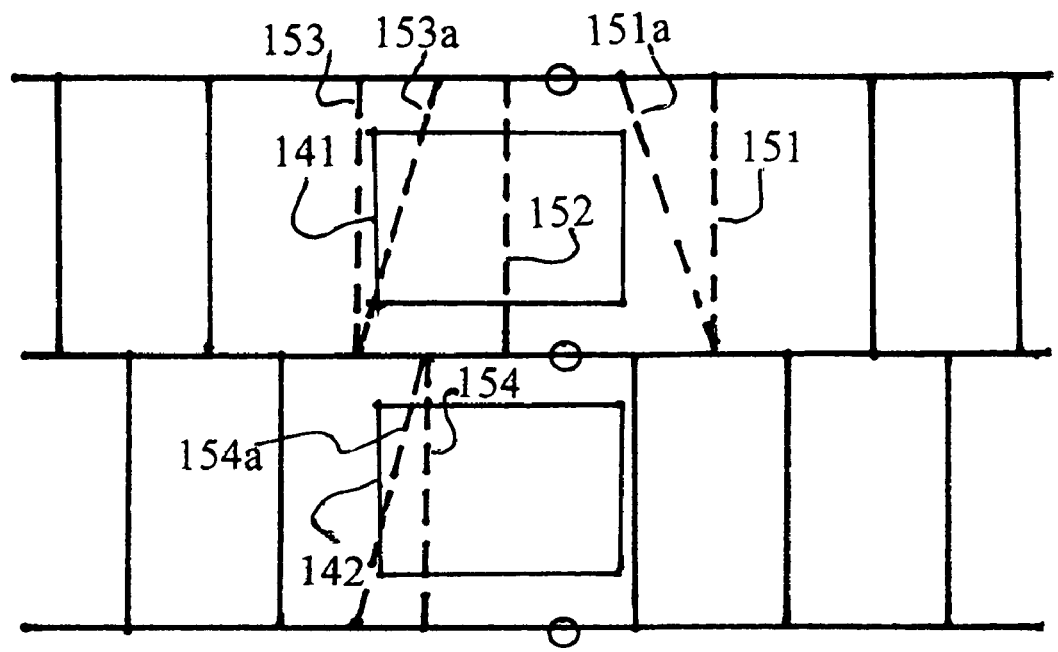
Figure 11B:
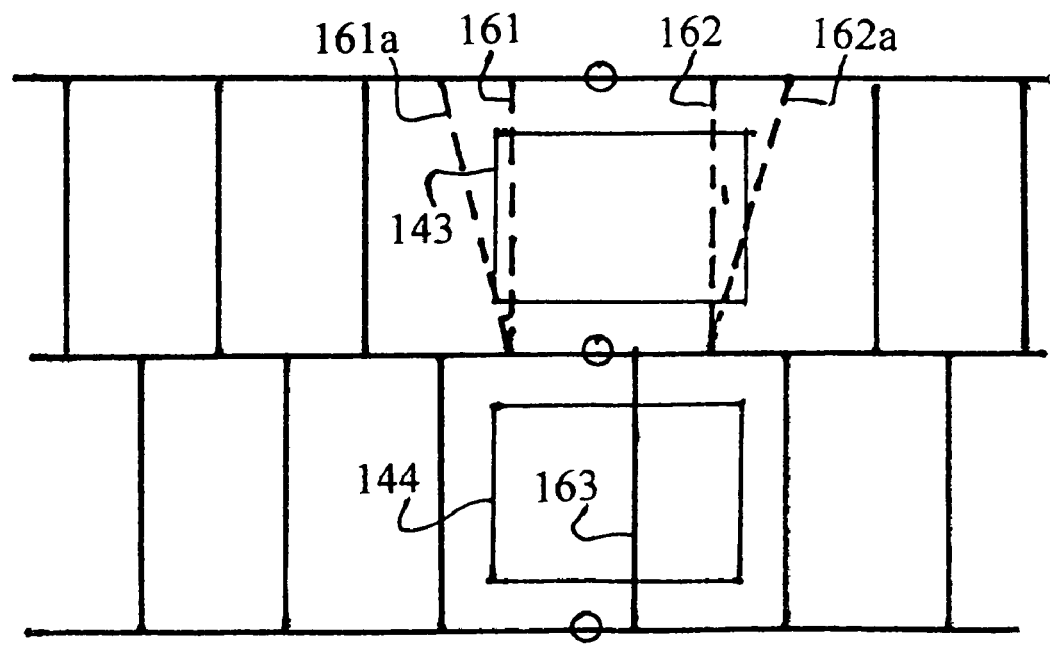
Figure 12A:
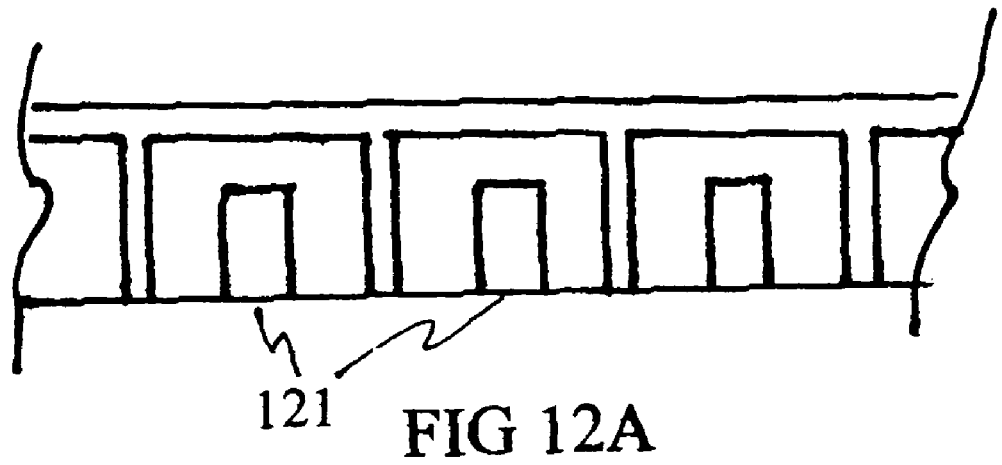
Figure 12B:
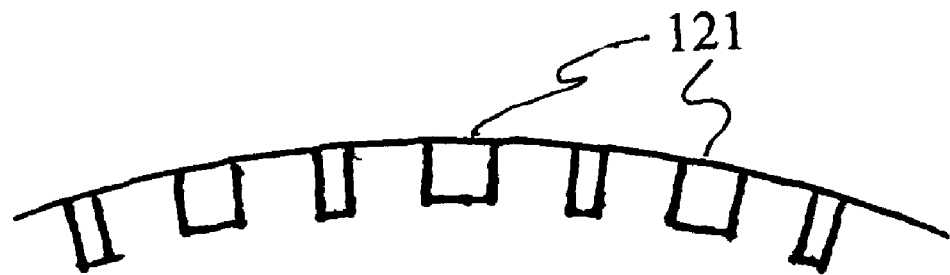
Figure 12C:
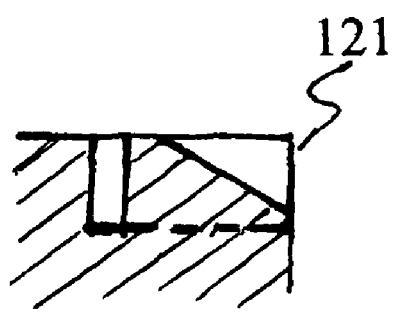

FIGS. 1A and 1B The end-of-chain gap mounted about the tire footprint.
FIGS. 2A and 2B Patterns for movable cross chains.
FIG. 3A Adjustment link.
FIG. 3B Adjustment link installed.
FIGS. 4A and 4B A pivot lever in mounting and operating positions.
FIG. 4C Alternative pivot lever
FIG. 5A mechanical tension source alternative.
FIG. 6A second mechanical tension source alternative.
FIG. 7A tension source for manual placement.
FIG. 8A, B, C Offsetting chain size increment of four links.
FIG. 9A to E Offsetting chain size increment of two links.
FIG. 10 Chain mounting technique.
FIGS. 11A and 11B Dual triple tire chains.
FIGS. 12A, B, C Tread shoulder groove pattern.

TABLE 2

CONFIGURATION AND MOUNTING OPTIONS

|  | Option 1 | Option 2 | Option 3 |  |
|---|---|---|---|---|
| Step a | Reduced size increment | No change | Movable cross chain | |
|  |  | ↓ ↓ | ↓ ↓ | |
|  |  |  | Choose One stop | Choose increased traction |
|  |  | Adeq. eoc gap | Non-adeq. |  |  |
|  |  | ↓ | ↓ | ↓ | ↓ |
| Step e | one stop | one stop | ¼ turn | one stop | ¼ turn |

All versions provide full strength chain.

Figure 13:
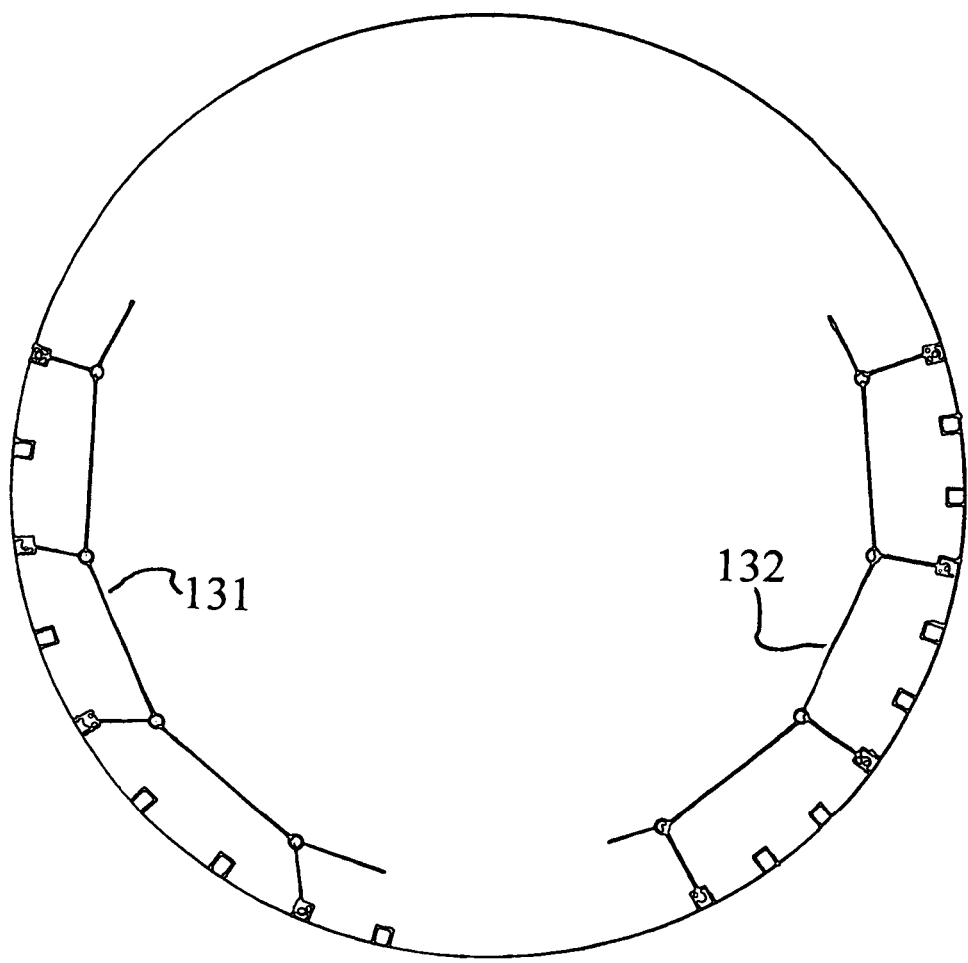

FIG. 13 Matching chain pattern to tire shoulder groove pattern.

Figure 14:
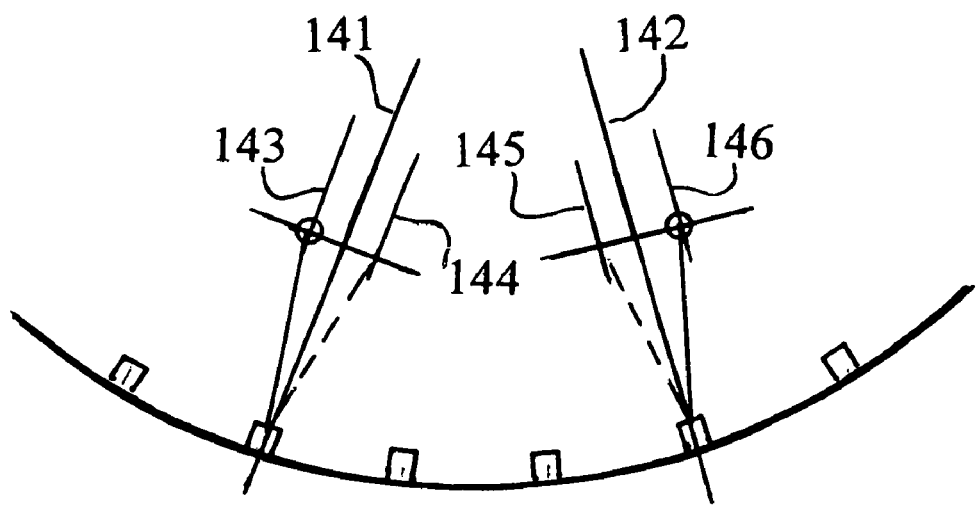

FIG. 14 Adjusting pattern match for tread wear.

DETAILED DESCRIPTION

FIG. 1A shows a wider end-of-chain gap 11a, and FIG. 1B shows a narrower end-of-chain gap 11b. 12a and 12b are the tire footprints in the two cases. The narrower gap causes a great amount more chain slack, because of increased cross chain deflection in mounting about the tire footprint.

FIGS. 2A and 2B illustrate the alternative manual placement, by the user, of a loose supplied cross chain. The chain can be placed square across, or diagonally to suit the tire footprint length.

The chains illustrated have normal cross member spacing of four links. In FIG. 2A, the loose cross member can be placed at locations 21, 22, or 23 respectively at 2, 4, or 6 link spacing. In FIG. 2B, the loose cross member can be placed diagonally, as at location 24, or it can be fixed at one end and pivoted to either location 25 or 26. Optionally, the pivoting member can be one link longer to correct for the angular position.

FIG. 3A illustrates an adjustment link for improving the fit of the chain on the wheel, by improving the hooked length of the outer face side chain. If the pitch is 0.5 to 1.0 times the side chain link pitch, the adjustment link will replace one side chain link (a difference of 0.0 to 0.5 ratio in pitch). If the pitch is 1.0 to 1.5 times the side chain link pitch, the adjustment link will replace two side chain links (a difference of 0.5 to 1.0 ratio in pitch). A preferred embodiment is a pitch of one half of the side chain link pitch, so a single adjustment link can ensure a maximum slack of half a standard link (about one inch).

FIG. 3B illustrates the installation of the adjustment link. Standard link 31 is dropped and adjustment link 32 is manually placed. The adjustment link can be left open, or clamped shut, at the option of the user.

FIG. 4A shows a pivot lever (in position 41a) which is a major element of the closure assembly for the outer face side chain. FIG. 4B shows the operating position 41b of the pivot lever, attached to the outer face side chain. Connection 43 is a fixed location attachment point to the side chain. Connection 44 is the bottom end of a sliding connection to the side chain. Connector 45 slides in the connection 44, and at the free end is fitted with an open hook or hook with manually operated latch, for hooking into the end link of the side chain, or the adjustment link, if used, as represented at 42a and 42b. The initial hooking position of the pivot lever is counter clockwise from position 41a and is relatively non-critical, dimensionally.

The pivot lever of FIGS. 4A and 4B and the adjustment link of FIG. 3A are configured to comprise a combination for optimizing the tension stroke of the pivot lever, for tensioning the chain assembly. The chain designer will set the dimension from connection 43 to connection 44 according to the expected resilience of the tire mounted on, and the easily attained manual leverage on the pivot lever.

The end position of the pivot lever stroke is beyond the point of hooking to the side chain. Touching the side chain is a good reference point. The beginning point of the tension stroke is approximately the position 41a illustrated, and is specifically defined as the point at which the chain becomes taut, but with negligible tension. That position will be determined by hooking to the side chain.

The normal accuracy for hooking the side chain is to hook the side chain link which provides the least slack. Thus the maximum hooking slack is one side chain link pitch length of just under two inches. One adjustment link per FIG. 3A of half a side chain link pitch will provide a half link accuracy. A two link set can provide a one third pitch accuracy. A three link set can provide a one fourth pitch accuracy, etc.

Thus, the adjustment link (or set of links) is used to establish the beginning point of the tension stroke of the pivot lever. In the prior art, such accuracy has not been meaningful, in light of total chain slack of up to more than five inches (four cam tighteners at one and a quarter inches capacity, each).

FIG. 4C shows an alternative configuration of the pivot lever of FIGS. 4A and B. A feature of this configuration is the use of a standard or special pitch link 46 to slide onto the lever to connect the side chain into a loop on the tire. An adjustment link 47, is placed as needed, to locate the pivot lever.

All of the above relates to the use of tire resiliency as a tension source. The use of a mechanical tension source as in FIG. 5, 6 or 7, greatly simplifies the demands on the pivot lever and adjustment link.

Figure 5:
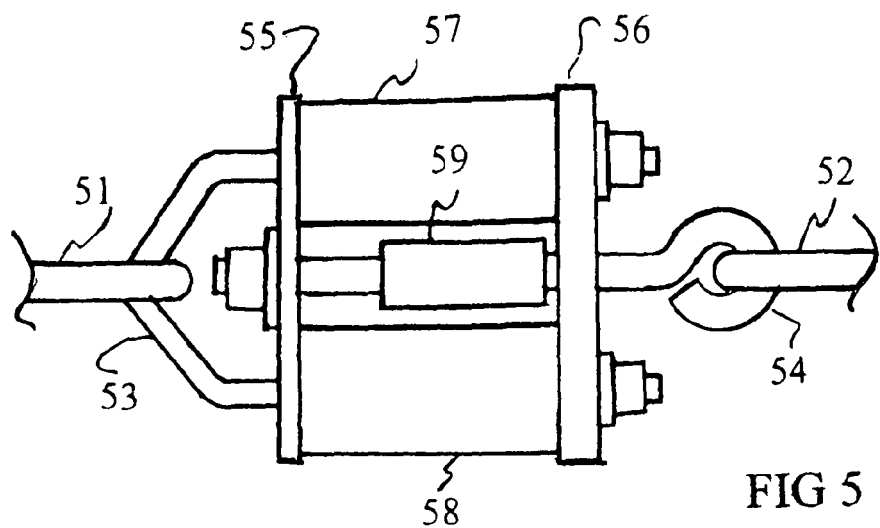

FIG. 5 is an example of a mechanical tension source installed integrally to the outer face side chain at links 51 and 52. Through rods 53 and 54 act through end plates 55 and 56 to compress elastic elements 57 and 58, which can be steel springs or rubber cylinders. Sleeve 59 is a travel limiter to enable the assembly to withstand random tension spikes, in severe operation, such as skids. For that reason end plate 56 must be adequate for those high loads. The tension source is compressed during chain mounting and makes the stored tension available during operation.

Figure 6:
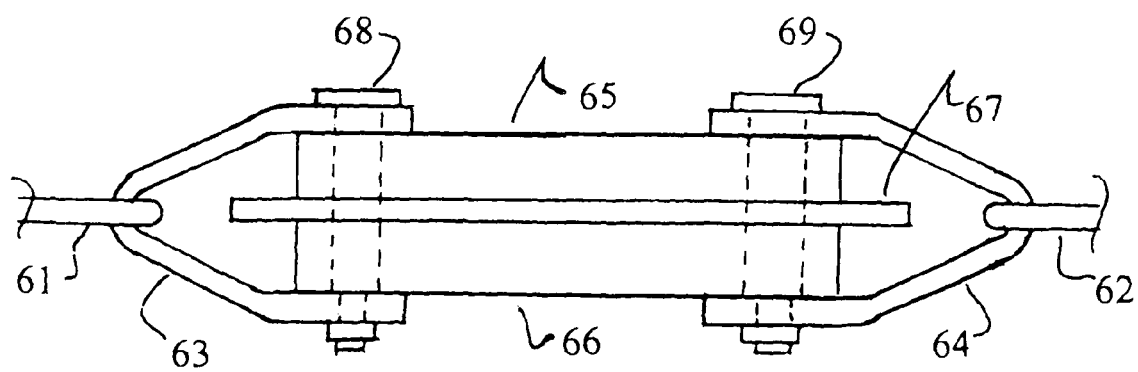
Figure 6:
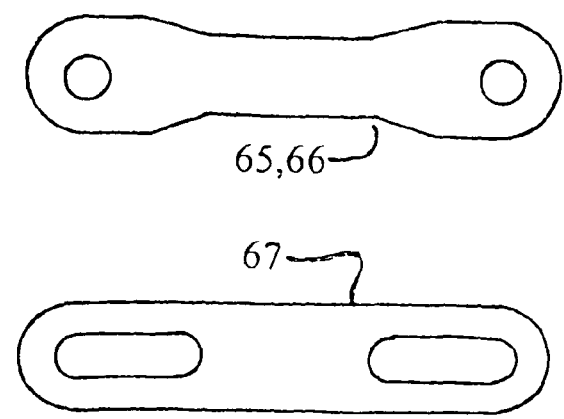

FIG. 6 is an alternative example of an integral tension source, fastened to side chain links 61 and 62. End yokes 63 and 64 and pins 68 and 69 support elastic tension elements 65 and 66 and a steel plate travel limiter 67 to withstand the tension spikes mentioned above.

Figure 7:
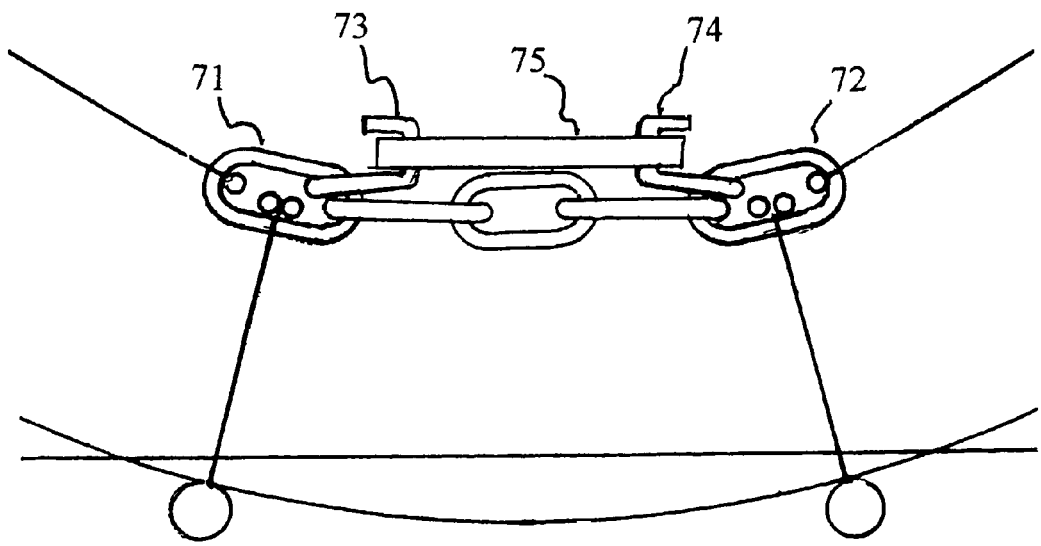
Figure 8A:
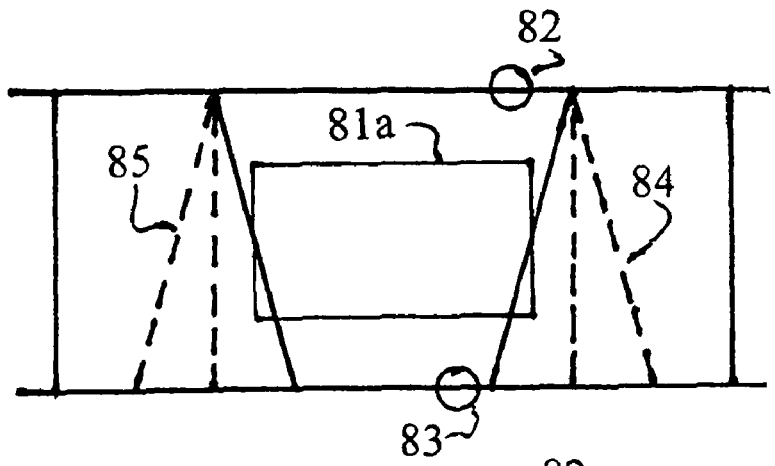

FIG. 7 shows a manually placed tension source. Elastic band 75 is held by end clips 73 and 74, which are manually hooked into adjacent outer face side chain cross chain attachment links 71 and 72. In this example, the side chain acts as the travel limiter.

The several elements of the multi-part system of this invention eliminate the larger sources of chain slack, such that a moderate amount of deflection of cross chains, by the footprint of the tire, is relatively easy to handle. Thus, hooking accuracy becomes meaningful, and reduction of slack by alignment of cross chains becomes meaningful. This low total slack enables concentration of the mechanical reduction of slack to one point at the ends of the chain, as part of the chain attaching mechanism.

The force, required to induce the repositioning of the cross chains, upon initial operation, is very small, as, with low chain tension, the deflected chains will reposition from centrifugal force due to the vehicle travel. In effect, the need for tension is only to remove the slack created in the outer face side chain, by realignment of the deflected cross chains. That tension can be provided by one of the tension sources described above. If the chain is mounted in a snug manner on the tire, stabilized by steel, the tension devices do not have to provide tension equal to the full measure of centrifugal force at operating speeds.

FIGS. 8A, B, C and FIGS. 9A to E illustrate offsetting the effects of adding size increments to tire chains in the supply of a range of chain sizes, to counteract the effects of the size increments on the spacing of the end cross chains upon the tire. That spacing of end chains is the critical factor in mounting the chain about the tire footprint for one stop mounting.

Adding chain length to go to the next larger chain size shortens the end cross chain spacing. Adding links at the side chain hooking points, as tire size increases, increases the end chain spacing. Both effects must be counteracted and offset to maintain the end chain effective spacing appropriate to the tire footprint. The precise fit is established by the act of fastening the chain about the footprint. Thus, the question becomes that of keeping the end chain deflection and resulting slack in an appropriate range to facilitate mounting the chain.

FIG. 8A, B, C displays offsetting a size increment of four side chain links, with two movable (pivoting) end cross chains. FIG. 9A to E offsets two link increments with one movable cross chain. In each case, the movable cross chain is used to lengthen the end-of-chain spacing as it is shortened by adding the size increment, then used to shorten the spacing as it is lengthened, as links are added to the side chains to accommodate increasing tire sizes.

In the figures, 81a, b, and c and 91a to e are the respective tire footprints. 82, 83 and 92, 93 are the respective side chain fasteners.

FIG. 8A represents the maximum tire size coverage of a given chain size. 84 and 85 are movable cross chains, fixed at one end.

Figure 8B:
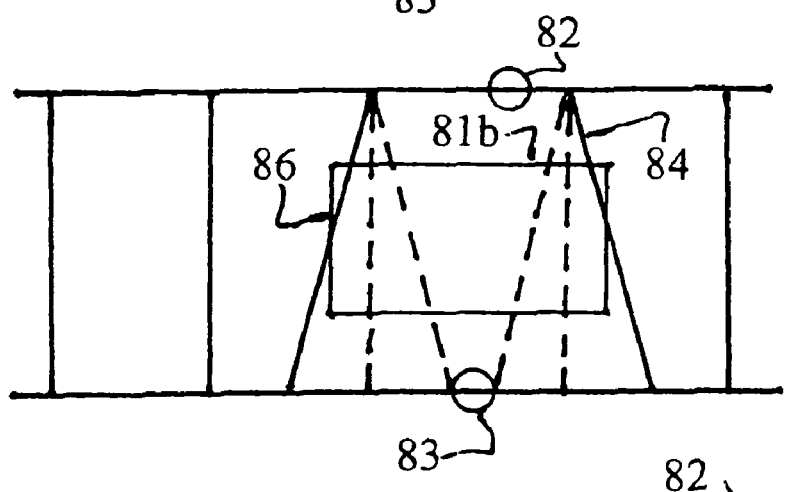

FIG. 8B adds a size increment of a cross chain at a spacing of four links, requiring shifting of movable chains 84 and new movable chain 86, in order to maintain the spacing of the end cross chains, relative to the tire footprint.

Figure 8C:
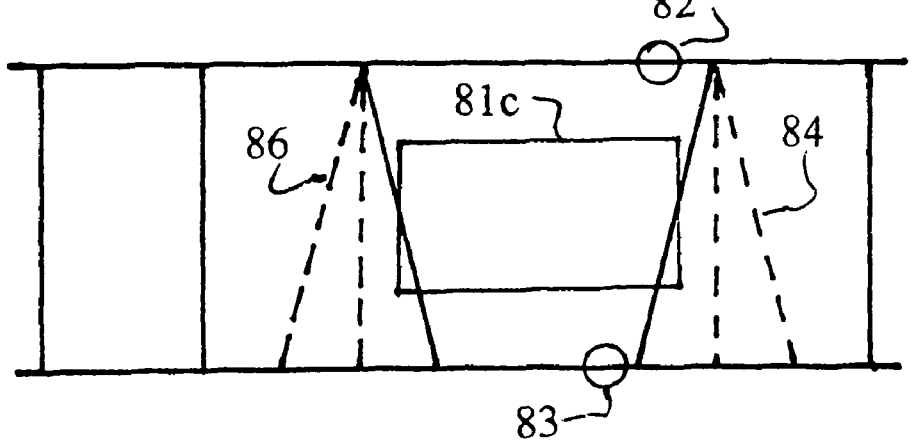

FIG. 8C illustrates the action of adding side chain links to accommodate increasing tire sizes, to the limit of the upper end of the new chain size range.

The actions of 8B and 8C are then repeated, for a new chain size.

The steps in FIGS. 9A to E are analogous to 8A, B, C above, except the size increment illustrated is only two side chain links, therefore only one movable cross chain is required to offset the effect on the end of chain cross chain spacing.

9B deletes a cross chain at four link spacing and adds a cross chain at six link spacing, for a net of plus two links.

9D deletes a cross chain at six link spacing and adds two cross chains at four link spacing, for a net of plus two links. In each case the end of chain spacing is maintained by shifting the new movable cross chain.

Figure 9A:
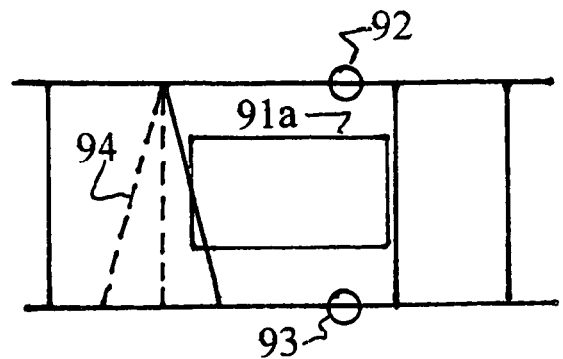
Figure 9B:
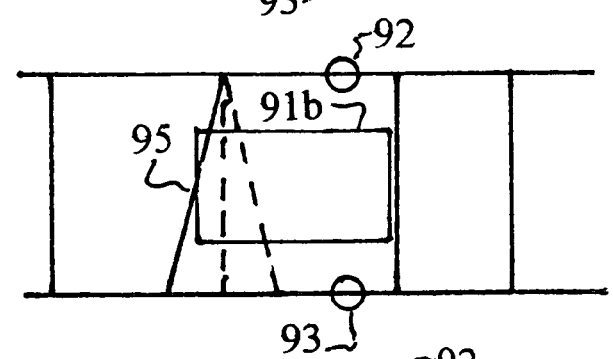
Figure 9C:
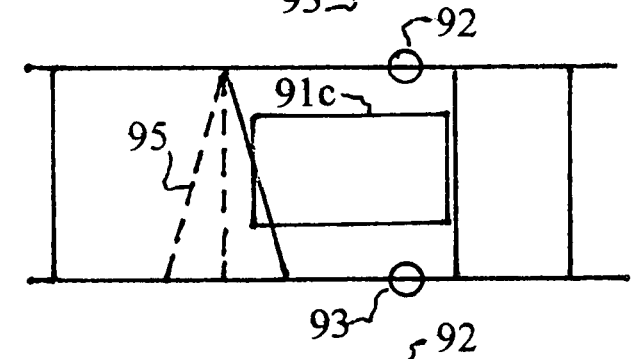
Figure 9D:
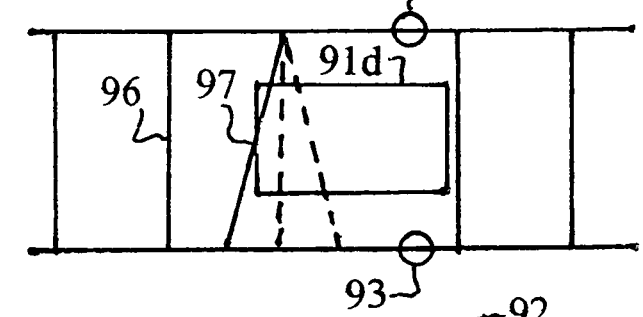
Figure 9E:
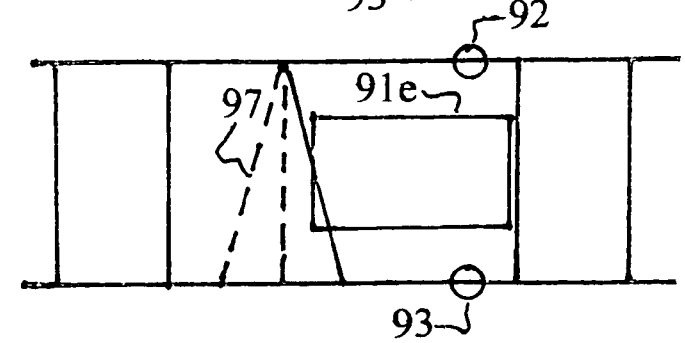

FIGS. 9C and 9E each display adding chain links by hooking the side chain fasteners, to lengthen the chain to accommodate larger tire sizes. In each case, the movable cross chains are shifted to offset the increased tire footprint length.

Following the step of FIG. 9E, the cycle is repeated, for a new chain size.

FIG. 10 displays an improved chain mounting technique, in which the following steps are performed sequentially:
  Drape the chain over the top of the wheel.
  Fasten the inner face side chain.
  Align the cross chains on the top half of the wheel.
  Apply a temporary rubber strap low on the chain.
  Align the cross chains in the lower part of the chain.
  Optional:
    For an adequate end-of-chain spacing, fasten the outer face side chain, which will constitute one stop mounting of the chain.
    For a non-adequate end-of-chain gap, stabilize the two lowest cross chains, turn the wheel one quarter turn and fasten the outer face side chain.
  Cross chains 101 on the top half of the wheel can be readily aligned manually, due to tension of the hanging chain. Cross chains 102 can be manually aligned by temporarily installing rubber strap 103, to hold chains 102 in place, on the tread.

The above is very helpful to final results, as any cross chain misalignment will result in a bit of looseness when cross chains naturally align in operation, due to centrifugal action.

If the spacing of cross chains 104 around the tire footprint, is near enough to their natural positions, in operation, the outer face side chain can be attached in the wheel position shown (which is one stop mounting). If the spacing of chains 104 is too narrow, chains 104 can be stabilized with the pivot lever, the wheel can be turned one quarter revolution, and the side chain fastened, with all cross chains in their natural operating positions, thus facilitating a full strength mount.

The "too wide" factor will vary, depending on the tire loading and resulting footprint length, and the capability of tension sources provided. It should be noted that this fall back capability, of turning the wheel, always allows the tire chain to be mounted in a full tight condition, fully stabilized by steel, not rubber. Thus, the mounting method of FIG. 10 is inherently superior to the present day roll on mounting.

It is the user's choice to place movable cross chains for a wide end-of-chain gap on both wheels, or to leave the outer wheel gap narrow for maximum traction, and use the quarter turn feature of the mounting technique, for a successful mount.

A large truck tire chain would typically use four cam tighteners to remove slack in the chain. The novel mounting technique of FIG. 10 and the other innovations in the disclosure completely eliminate the need for cam tighteners, and greatly improve the ability for one stop mounting, as well as providing a fall back procedure to guarantee full strength mounting in any conditions.

FIGS. 11A and B show dual triple chains having three side chains and having cross chains in a staggered pattern. Cross chains are furnished loose and unattached for the user to place as appropriate for the footprint on each tire. The chain is also equipped with adjustment links and pivot levers as appropriate, and uses the disclosed mounting technique, for successful mounting. Tire footprints are identified as 141 and 142 in FIG. 11A, and 143 and 144 in FIG. 11B.

The purpose of FIGS. 11A and 11B is not to illustrate two chain configurations. It is to illustrate the flexibility of the innovative designs of the invention. There is a myriad of possible configurations which could be employed.

In FIG. 11A, potential cross chains supplied loose are chains 151, 152,153 and 154.

Chain 151 is manually located at 151a. Chain 152 is not used. Chain 153 can stay in the 153 position, or can be located at 153a. Chain 154 will be positioned at 154a. Note that a small change in the gaps of FIG. 11A will change the patterns chosen.

In FIG. 11B, chain 163 is left in position, so the alternative mounting option of turning the wheel a quarter revolution is employed to complete the mounting of the chain.

Loose chains 161 and 162 could be positioned at 161a and 162a. As shown, 161 and 162 could stay in the original (natural) positions. If the gap were somewhat larger, original positions 161 and 162 would surely be the preferred locations. The principle illustrated is to enable the inside wheel chain to be fully tightened in the initial mounting position.

It can be further noted that the choices indicated need only be made during the customary initial test mounting. The chains could stay in those locations for subsequent usage.

FIGS. 12A, B, and C illustrate a shoulder groove pattern on the tread of an open shoulder tire, to be matched by the cross chain pattern of a tire chain. This resolves several chain mounting and operational problems with open shoulder tires, including difficult chain mounting, poor chain fit, and tread damage due to chain usage.

The basic feature of the concept is to adopt a chain configuration (or tire groove configuration) which will enable all cross chains of the tire chain to be easily manually seated in shoulder grooves when mounting the chain on the tire, and over the life of the tire, as tread wear changes the fit of the chain on the tire.

There are three alternatives to achieve this combination. If it is arrived at by matching the tire tread design to a commercially available tire chain, then the groove count, to accommodate the chain, will be the sum of the chain cross member count, plus the ratio of the excess of the spacing distance between the end-of-chain cross members, when mounted on the wheel, greater than the standard spacing of the cross members, times a whole number multiplier, with the multiplied sum to be adjusted to allow for future tire tread wear and corrected to the nearest whole number. The whole number multiplier could be one to four, for a groove count, on one shoulder, of about 15 to 60. The objective is to enable the seating of each tire chain cross chain in a shoulder groove of the tire, during the life of the tire.

If the match is obtained by modifying a tire chain to suit the groove pattern of a commercially available tire, then the procedures illustrated in FIG. 13 are used, in which a location for the distance of the side chains from the tread surface is selected, which places the cross chains in position on the tire to be manually seated in an appropriate shoulder groove.

The third method is to select the design of both groove pattern and cross chain pattern to optimize the combination.

FIG. 13 illustrates the need for enough radial distance of the side chain from the tread edge, to enable a low angularity (off of radial) from the cross chain attachment point to the shoulder groove where the chain is seated. Ideally, this angularity will be less than thirty degrees. A number of groove spaces must be selected, as the end-of-chain spacing, as high as possible, for fit and economy, and low enough (close enough) to meet state laws as to ground contact of the chain.

FIG. 13 represents a forty inch diameter truck tire, fitted with tire chains of typical specifications. Chain section 131 represents a standard chain at the recommended spacing from the tread of about three inches, and a shoulder groove count of thirty. It would be inconvenient to seat all the cross chains in grooves for this combination. Section 132 represents an optimized combination of tire and chain, with a shoulder groove count of forty, and the standard chain of section 131, modified with a cross chain count to provide an improved location of the side chain.

In FIG. 14, the selected end of chain gap is the three space gap from groove 141 to groove 142. At the chain ends, 143 to 144 and 145 to 146 indicate the anticipated increased chain wrap due to tread wear over the life of the tire. This "growth" will be approximately centered on the selected grooves representing the end of chain gap.

CONCLUSION, RAMIFICATIONS, AND SCOPE OF INVENTION

It is evident that a highly interactive set of modifications to standard tire chains has been disclosed, which the chain designer can incorporate in a very flexible manner. Included in the flexibility are features which allow the chain user to adapt a chain to his specific needs, including tire size, road conditions, vehicle loading, expected duration of traction enhancement, and other variables affecting chain usage.

While the above description contains many specifics, these should not be construed as limitations on the scope of the invention, but rather as examples of preferred embodiments thereof. Many other variations are possible.

Accordingly, the scope of the invention should be determined, not by the embodiments illustrated, but by the appended claims and their legal equivalents.

I claim:

1. A tire chain, of link construction, for installation on a vehicle wheel resting on the roadway, comprising a generally circular, flexible side member forming a loop on the inner face of the tire, and a like member on the outer face of the tire, and a multiplicity of flexible cross members arrayed on the tire tread, between the two side members, and said chain has a first end and a second end and the installation procedure includes the step of imposing the two end-of-chain cross members around the edges of the -tire-to-ground-contact area, and the pattern of cross members is of such density that there is always a cross member in the -tire-to-ground-contact area during operation, within the length of the chain, regardless of the space between the end-of-chain cross members, when mounted on the wheel, and the chain is constructed with three features in combination, comprising an attachment means, for attaching the outer face side member into a loop on the wheel, and a pivot lever means for removing chain slack and increasing chain tension, and the typical accuracy for hooking the outer face side member into a loop on the tire is one side member link pitch length produced by hooking one side member end into the closest possible side member link along the circumference of said side member, to produce the shortest available side member, and the side member attachment means comprises sliding a side member link over the elongated pivot lever, and the third feature in combination comprises means for user selection of the loop length of the outer face side member when the chain is fully mounted on the wheel, at an accuracy of selected length greater than the one link accuracy possible with side member straight links, and said means for user selection of the loop length of the side member when fully mounted is an adjustment link for manual replacement of the link serving as the side member attachment means, and an adjacent link when needed, and said adjustment link has a pitch length less than the link or links which it replaces, whereby the three features in combination are provided by two mechanisms.

2. The tire chain of claim 1, wherein the pivot lever mean comprises an elongated pivot lever, having a fixed location attachment point to the side member, at a first end of said lever, and a slidable second attachment point to said side member, located away from said first end, along the lever longitudinal axis, and said fixed location and sliding attachment points are located substantially along the longitudinal axis of the elongated lever, and when closing the lever to remove slack and increase chain tension, the lever rotates about the fixed location attachment point, and is manually fastened at the second end, to said side member, whereby the described geometry produces very high leverage at the end of the closing stroke.

3. The tire chain of claim 2, wherein the pivot lever in combination with a tension source means, to store energy, during the mounting process, for delivery to the chain during operation, to reduce slack in said chain, and assist in providing a desired level of operating chain tension, and said tension source means is selected from the group of
  a. the tire, which deflects under the pressure of the points of contact of the chain, under tension, and the resiliency of the tire causes it to act as a tension source means, and
  b. a mechanical elastic means, constructed integrally with the outer face side member, and constructed with elastic elements of steel springs or rubber elements, and having means to limit the travel of expansion or contraction in response to tension imposed on said tension source means, including random spikes of tension during operation, and
  c. a rubber tension element fitted with end hooks for manually hooking into two adjacent outer face side member links, comprising cross member attachment points.

4. The tire chain of claim 3, wherein the pivot lever with which a condition of taut chain is achieved with said pivot lever in a position approximately radial to the wheel, and further rotation, in its tensioning stroke, beyond that position, to fasten said pivot lever to the side member, in the operating position, imparts tension into said tension source for availability of the tension during operation, and the user, when mounting the chain, will use the adjustment link for the dual purposes of improving the fit of the outer face side member on the tire, and for positioning the pivot lever to complete its tensioning stroke in a position to be hooked to the side member, as its position during operation.

5. The tire chain of claim 1 in further combination with a control means for determining a size increment to add to a tire chain to create a next larger sized chain, and said size increment is smaller than an increment of adding one cross member at a spacing of four side member links.

6. The tire chain of claim 5 in which said control means for determining said chain size increment is selected from the list of
  a. furnish the chain with an end-of-chain cross member, loose and unattached, at one end or both ends, for placement and attachment by the user,
  b. add a cross member at a spacing of two side chain links,
  c. delete a cross member spaced at four links and add a cross member spaced at six links,
  d. delete a cross member spaced at six links and add two cross members spaced at four links.
  e. add a cross member having a diagonal orientation to the axis of the wheel.

7. The tire chain of claim 1, in further combination with a pattern of the cross members of the chain, arranged for mounting on a vehicle tire having evenly spaced grooves normal to the circumferential edges of the tread, comprising the shoulders of the tread, wide enough to accept within said grooves, commercially available chain cross members, whereby upon mounting the chain on the tire, each cross member can be manually seated in said shoulder, grooves, during the life of the tire.

8. A method for supplying tire chains, of link construction, for a range of tire sizes, each tire chain for installation on a vehicle wheel resting on the roadway, and comprising a generally circular, flexible side member forming a loop on the inner face of the tire, and a like member on the outer face of the tire, and a multiplicity of flexible cross members arrayed on the tire tread, between the two side members, and said chain has a first end and a second end and the installation procedure includes the step of imposing the two end-of-chain cross members around the edges of the -tire-to-ground-contact area, and the pattern of cross members is of such density that there is always a cross member in the -tire-to-ground-contact area during operation, within the length of the chain, regardless of the space between the end-of-chain cross members, when mounted on the wheel, and a size increment is added to a given chain to comprise the next larger chain, and an adjustment means is provided to adjust the spacing of the end-of-chain cross members, on the tire, to offset the chain length added by the added size increment, and to offset chain length added within a given chain size, by side member hooking selection, to fit the chain to a specific tire size.

9. The method of claim 8 in which said size increment comprises adding one cross member at a spacing of four side member links, or the equivalent dimensional change from revised chain component specifications, and said adjustment means comprises providing both end-of-chain cross members with one end fastened, and one end loose and unattached, for attachment by the user.

10. The method of claim 8 in which said size increment comprises adding chain length of two side member links, or the equivalent dimensional change from revised chain component specifications, and said adjustment means comprises providing one end-of-chain cross member with one end fastened, and one end loose and unattached, for attachment by the user.

11. A method of mounting a tire chain, of link construction, on a vehicle wheel resting on the roadway, the chain comprising a generally circular, flexible side member having two ends and forming a loop on the inner face of the tire, and a like member on the outer face of the tire, and a multiplicity of flexible cross members arrayed on the tire tread, between the two side members, and the method comprising, sequentially, draping the chain over the top of the wheel, and attaching the inner face side member into a loop on the wheel, and manually aligning the cross members on the upper half of the wheel, and placing an elastic strap in a known manner on the lower half of the wheel to hold cross members in place on the tread, and manually aligning the cross members on the lower half of the chain, and clear of the ground, and mounting of the chain is completed without moving the wheel, or at the option of the user, the wheel is driven to turn about one fourth of a revolution and mounting of the chain is completed, whereby the user is enabled to make a choice, for each chain mounting occurrence, when chain fit on the tire permits, between a one stop mount, or a minimum slack, full strength two stop mount, when chain fit, or roadway, or trip conditions indicate.

12. The method of claim 11 used for a chain having one or more manually movable, end-of-chain cross members.

13. The method of claim 11 used for a chain mounted on a tire having shoulder grooves wide enough to accept cross members of the chain within the width of the grooves, and while mounting the chain, each cross member can be manually placed into a shoulder groove for the lifetime of the tire tread.

14. The method of claim 11 adapted for a chain for use on dual wheels, having three side members comprising an outer face side member, an inner face side member, and a middle side member between the wheels, and the cross members for the inner wheel are attached to the middle side member, at midpoints between the attachment points for the cross members for the outer wheel, and the side member attached into a loop on the wheel, after draping the chain on the wheel, is the middle side member, between the wheels.

15. The adjustment link of claim 1 has a pitch length less than the one or two straight links it replaces, and if one said adjustment link is provided, it would have approximately one half a pitch length less than one straight link, and if a set of two adjustment links was provided, the two would have respectively, approximately one third and two thirds a straight link pitch length less, and a three link set, approximately one fourth, one half and three fourths less pitch lengths.

* * * * *